(12) United States Patent
Joshi

(10) Patent No.: US 8,477,517 B2
(45) Date of Patent: Jul. 2, 2013

(54) CONTACT-INPUT ARRANGEMENT FOR POWER SYSTEM DEVICES

(75) Inventor: Milind H. Joshi, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 480 days.

(21) Appl. No.: 12/427,082

(22) Filed: Apr. 21, 2009

(65) Prior Publication Data
US 2010/0265743 A1      Oct. 21, 2010

(51) Int. Cl.
*H02H 7/00* (2006.01)

(52) U.S. Cl.
USPC ............... 363/51; 323/303; 363/74; 307/130; 327/514

(58) Field of Classification Search
USPC .. 323/299, 303, 304; 363/50, 51, 74; 307/125, 307/130; 327/514
See application file for complete search history.

(56) References Cited

U.S. PATENT DOCUMENTS

| | | |
|---|---|---|
| 4,420,784 A | 12/1983 | Chen |
| 4,562,547 A * | 12/1985 | Shauger ............ 702/70 |
| 4,618,906 A | 10/1986 | Paice |
| 4,652,962 A | 3/1987 | Howell |
| 4,658,320 A | 4/1987 | Hongel |
| 4,704,652 A | 11/1987 | Billings |
| 5,398,025 A * | 3/1995 | Herman ............ 340/660 |
| 5,517,378 A | 5/1996 | Asplund |
| 5,536,980 A | 7/1996 | Kawate |
| 5,652,688 A | 7/1997 | Lee |
| 5,675,640 A * | 10/1997 | Tappert et al. ........... 379/374.01 |
| 6,489,748 B1 | 12/2002 | Okamura |
| 6,816,350 B1 | 11/2004 | Hoopes |
| 6,956,725 B2 | 10/2005 | Boughton |
| 7,728,749 B2 * | 6/2010 | Sahu ............... 341/144 |
| 7,746,877 B2 * | 6/2010 | Trethewey ............ 370/401 |
| 7,778,262 B2 * | 8/2010 | Beagley et al. ............ 370/401 |
| 7,795,885 B2 * | 9/2010 | Gorczyca et al. ......... 324/754.23 |
| 8,009,055 B2 * | 8/2011 | Lindsey et al. ............... 340/662 |
| 8,276,006 B2 * | 9/2012 | Sawyers et al. ............... 713/300 |
| 2004/0217749 A1 * | 11/2004 | Orr et al. ......... 323/299 |
| 2007/0120694 A1 * | 5/2007 | Lindsey et al. ............... 340/662 |
| 2007/0127177 A1 | 6/2007 | Benton |
| 2008/0204274 A1 * | 8/2008 | Peters ............ 340/870.07 |
| 2009/0125124 A1 | 5/2009 | Premerlani |

OTHER PUBLICATIONS

IBM TDB, "Power Line AC Voltage Presence Sensor", Oct. 1, 1987, IP.com No. IPCOM000040151D.*

* cited by examiner

*Primary Examiner* — Adolf Berhane
*Assistant Examiner* — Lakaisha Jackson
(74) *Attorney, Agent, or Firm* — Eugene M. Cummings, PC

(57) ABSTRACT

A contact-input circuit for a power system device is described for processing a higher voltage signal from power system equipment or another power system device for use by a lower voltage circuit. The contact-input circuit generally includes a voltage threshold detection device adapted to allow current to flow therefrom when it detects that the higher voltage signal reaches a select threshold. An opto-isolator device, which is coupled to the voltage threshold detection device, provides a voltage signal suitable for use by the lower voltage circuit when the threshold detection device allows the current-flow through the opto-isolator.

27 Claims, 5 Drawing Sheets

CONTACT-INPUT ARRANGEMENT FOR POWER SYSTEM DEVICES

BACKGROUND OF THE INVENTION

The present description generally relates to power system devices for monitoring, metering, protection and control of electric power systems, and more specifically, to a contact-input arrangement for power system devices.

In an electric power system, energy is generated and transported from the generating facilities to locations and loads requiring the energy. Electric power systems include a variety of power system equipment such as electrical generators, electrical motors, power transformers, power transmission lines, buses and capacitors, to name a few. The electric power systems also include power system devices such as monitoring devices, control devices, metering devices, and protective devices which monitor, control and protect power system equipment. High-speed communication is necessary among power system devices and between power system devices and power system equipment in order to provide reliable protection, metering, monitoring and control in an electric power system or grid.

FIG. 1 is a single line schematic diagram of an electric power system 10 that may be utilized in a typical wide area. As illustrated in FIG. 1, the power system 10 includes, among other things, three synchronous generators 11, 12 and 13, configured to generate three-phase sinusoidal waveforms such as 12 kV sinusoidal waveforms, three step-up power transformers 14a, 14b and 14c, configured to increase the generated waveforms to a higher voltage sinusoidal waveforms such as 138 kV sinusoidal waveforms and a number of circuit breakers 18. The step-up power transformers 14a, 14b, 14c operate to provide the higher voltage sinusoidal waveforms to a number of long distance transmission lines such as the transmission lines 20a, 20b, 20c and 20d. In an embodiment, a first substation 16 may be defined to include the two synchronous generators 11 and 12, the two step-up power transformers 14a and 14b and associated circuit breakers 18, all interconnected via a first bus 19. A second substation 35 may be defined to include the synchronous generator 13, the step-up power transformer 14c and associated circuit breakers 18, all interconnected via a second bus 25. At the end of the long distance transmission lines 20a, 20b, a third substation 22 may be defined to include bus 23, and two step-down power transformers 24a and 24b configured to transform the higher voltage sinusoidal waveforms to lower voltage sinusoidal waveforms (e.g., 15 kV) suitable for distribution via one or more distribution lines 26 to loads such as a load 32. The second substation 35 also includes two step-down power transformers 24c and 24d to transform the higher voltage sinusoidal waveforms, received via the second bus 25, to lower voltage sinusoidal waveforms suitable for use by respective loads 30 and 34.

A number of power system devices are connected at various points in the electric power system 10. For example, power system devices 100, 102 are shown operatively connected to select portions of the transmission line 20b. In general, a power system device such as 100, 102 may be configured to perform one or more of power system protection (e.g., a line current differential protection), automation (e.g., reclosing a circuit breaker), control (e.g., capacitor bank switching) and metering (e.g., power consumption calculation). Another power system device 104 may further monitor, control and/or automate power system devices 100, 102. For example, power system device 104 may be a programmable automation controller (PAC), which may be adapted to provide remote monitoring, data acquisition, control and automation of power system devices 100, 102. High-speed communication is necessary among power system devices 100, 102, 104 and between power system devices 100, 102, 104 and power system equipment in order to provide reliable protection, metering, monitoring and control in an electric power system or grid. For example, it is necessary for power system devices to quickly detect and isolate a fault on a transmission line.

SUMMARY OF THE INVENTION

In accordance with one embodiment, a contact-input circuit for a power system device is described for processing a higher voltage signal from power system equipment or another power system device for use by a lower voltage circuit. The contact-input circuit generally includes a voltage threshold detection device adapted to receive a higher voltage signal and allow current to flow through an opto-isolator when it detects that the higher voltage signal reaches a select threshold. The opto-isolator device generally provides a voltage signal suitable for use by the lower voltage circuit. The opto-isolator device may further be adapted to isolate the lower voltage circuit.

Various circuits may be used to preprocess the higher voltage signal such that it is suitable for use by the voltage threshold detection device and the opto-isolator device. A voltage reducing circuit may be provided to reduce the higher voltage signal to a voltage acceptable to the threshold detection device. A transient voltage suppressor may be provided to limit higher transient voltages in the higher voltage signal. A circuit may be provided to convert the AC voltage signal to a DC voltage signal. A protection circuit may be provided to ensure that the maximum voltage across the voltage threshold detection device and/or the opto-isolator device is within a safe limit.

It should be understood that the present disclosure includes a number of different aspects and/or features which may have utility alone and/or in combination with other aspects or features. Accordingly, this summary is not an exhaustive identification of each such aspect or feature that is now or may hereafter be claimed, but represents an overview of certain aspects of the present disclosure to assist in understanding the more detailed description that follows. The scope of the invention is not limited to the specific embodiments described below, but is set forth in the claims now or hereafter filed.

DETAILED DESCRIPTION OF THE PREFERRED EMBODIMENTS

Figure 1:
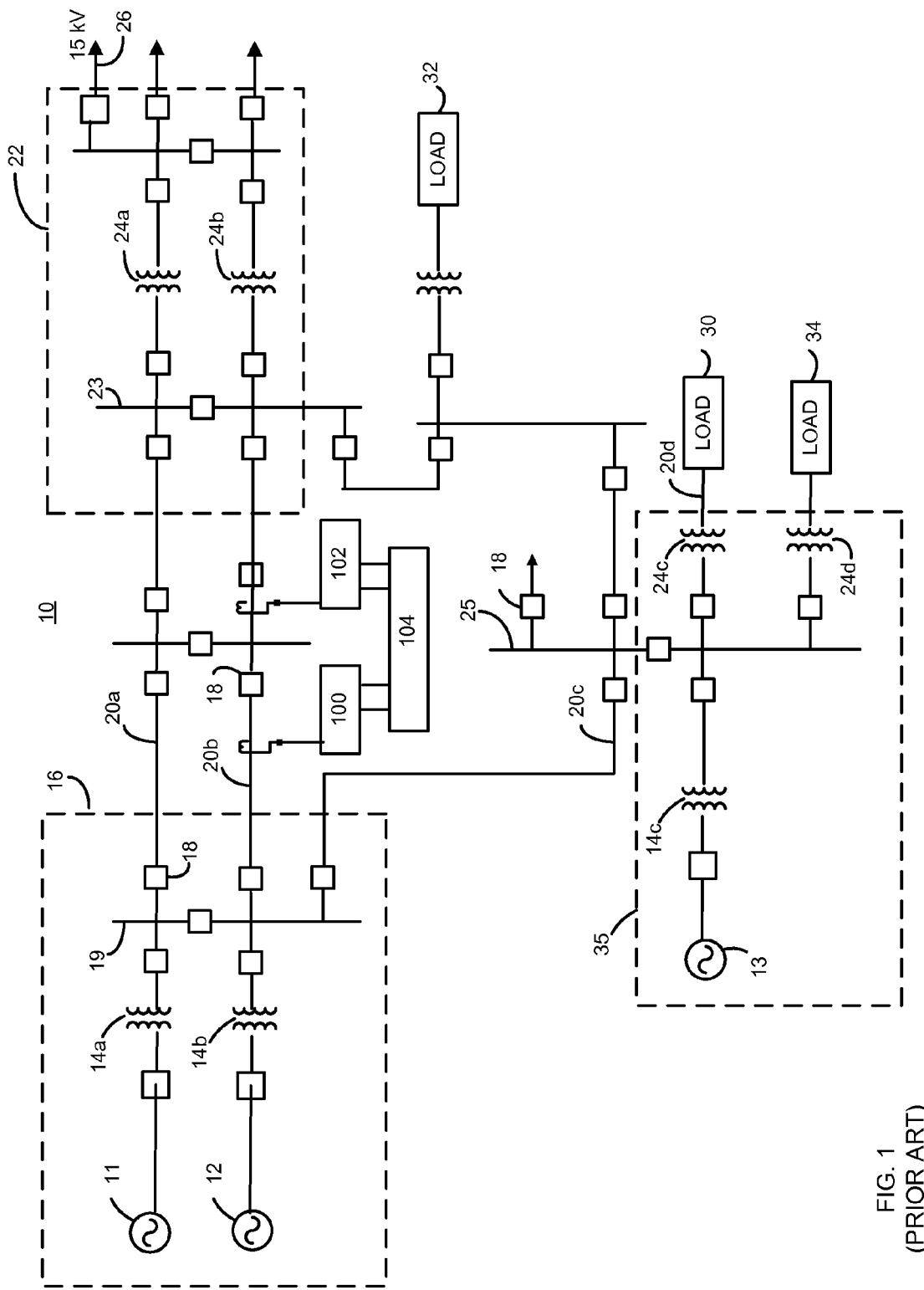
FIG. 1 is a single line schematic of a power system that may be utilized in a typical wide area network.
Figure 2:
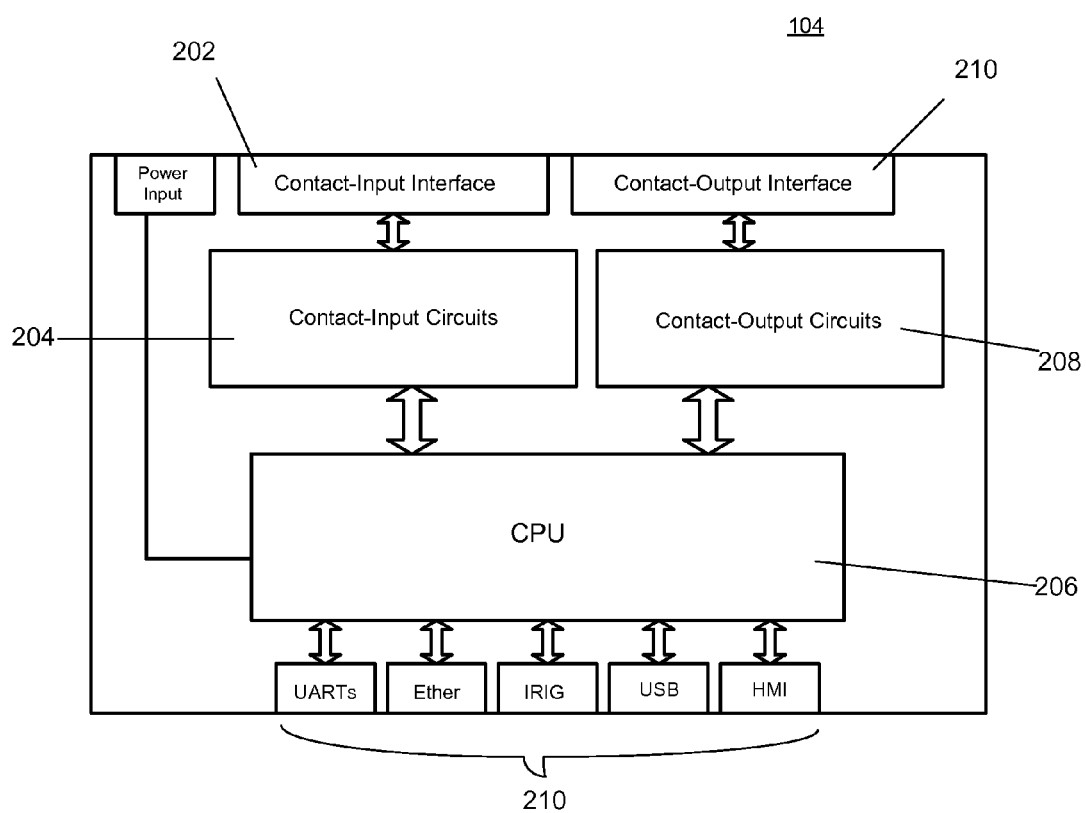
FIG. 2 is a block diagram of one of the power system device of FIG. 1 having a contact-input circuit.

One communication means, which is used in power system devices and power system equipment, is a contact-output, contact-input arrangement. For exemplary purposes only, FIG. 2 illustrates the power system device 104 of FIG. 1 in the form of a PAC. The PAC 104 is generally adapted to receive a plurality of voltage signals representative of select protection, metering, monitoring or control signals (e.g., an alarm signal, tripping signal, etc.) via a contact-input interface 202. The contact-input arrangement has two possible states: asserted when voltage is present across the input and deasserted when the voltage is not present across the input. Each voltage signal is a high-voltage signal, which is processed by a respective contact-input circuit 204. A low-current CPU 206 and other internal circuitry (not shown) uses the processed voltage signal to provide a protection, metering, monitoring or control signal based on the received voltage signal. The protection, metering monitoring or control signal may be transmitted to another power system device (e.g., power system device 100, 102 of FIG. 1) or power system equipment via a contact-output arrangement generally including a contact-output circuit 208 and contact-output interface 210. The power system device 104 may further have other communication means (e.g., UARTs, Ethernet, IRIG, USB, HMI 210) for communicating with power system or other related devices.

Figure 3:
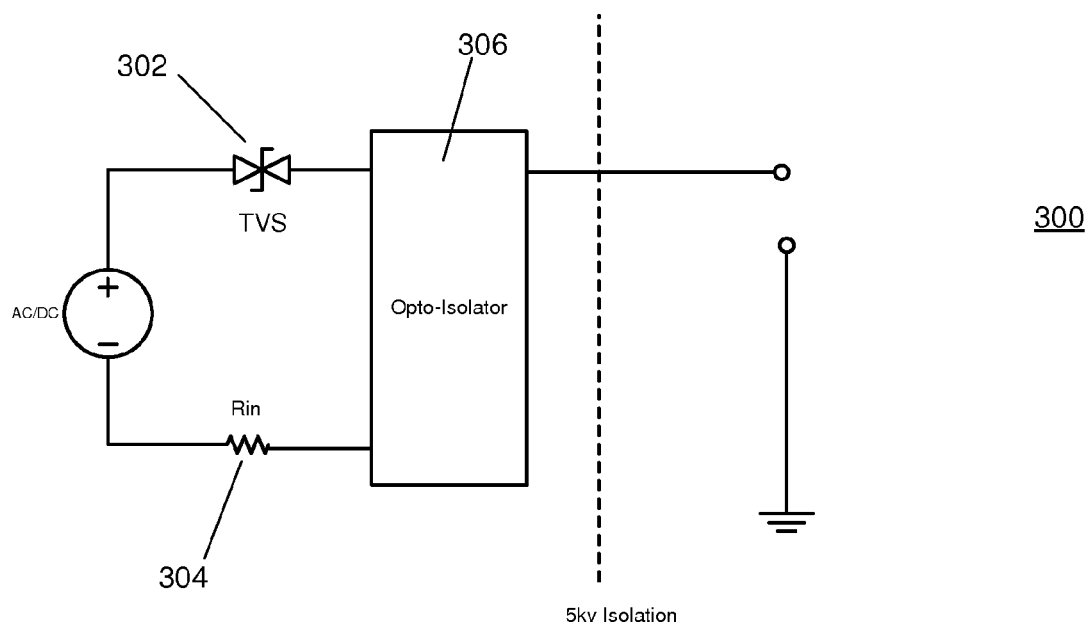
FIG. 3 is a circuit diagram of a prior art contact-input circuit.

FIG. 3 is an illustration of a traditional contact-input circuit arrangement 300 generally including a transient voltage suppressor (TVS) 302, a high-wattage resistor 304, and an opto-isolator 306. This traditional contact-input arrangement 300 may be used as the contact-input circuit 204 of the power system device 104 of FIG. 2 or, alternatively, in the power system devices 100, 102 of FIG. 1. Both the TVS 302 and opto-isolator 306 are bidirectional devices, thus allowing AC and DC voltage input signal processing. The TVS 302 generally limits high voltage or voltage spikes to acceptable levels. The opto-coupler 306 further provides a voltage signal suitable for lower voltage circuitry of the power system device (e.g., CPU of FIG. 2) and isolates such from transient voltage and voltage spikes from the power system.

In the contact-input circuit arrangement 300 of FIG. 3, the TVS 302 suppresses the voltage input signal such that it reaches the break-down voltage ($V_{br}$) of the TVS 302, which is typically about 60% of the nominal voltage of the contact-input circuit 300. Once the voltage input signal reaches the break-down voltage of the TVS 302, current flows through the TVS 302, the resistor 304 and the opto-isolator 306. At this point, the current flow becomes a linear function 516 (see FIG. 5) of the input voltage ($V_{in}$) and the input impedance ($R_{in}$). The response time for this arrangement is on the order of milliseconds.

In order to assure the assertion of the contact-input, the input impedance ($R_{in}$) must be low enough to ramp-up the current. A consequence of the lower value of input impedance ($R_{in}$) is a higher flow of current, thereby causing greater power dissipation and heat. It is therefore desirable to minimize the response time, power dissipation and heat associated with the traditional contact-input arrangement.

Figure 4:
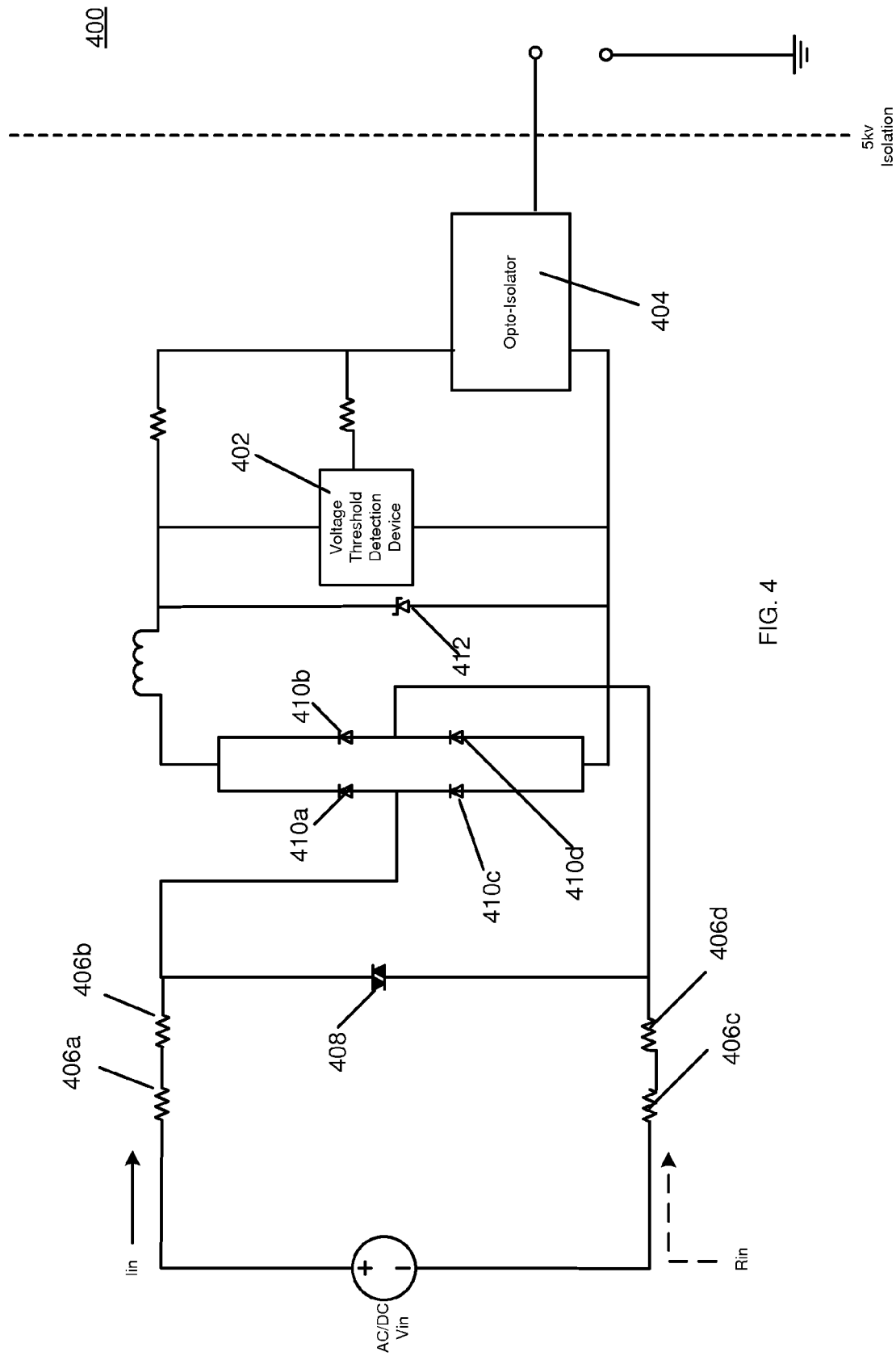
FIG. 4 is a circuit diagram of a contact-input circuit arrangement.

The present disclosure contact-input arrangement generally provides a circuit for a power system device for processing a higher voltage signal from power system equipment or another power system device for use by a lower voltage circuit. This contact-input arrangement may be used in any power system device (e.g., power system devices 100, 102 or 104 of FIG. 1). As illustrated in FIG. 4, the contact-input circuit 400 generally includes a voltage threshold detection device 402 adapted to receive the higher voltage signal and allow current to flow through an opto-isolator 404 when it detects that the high voltage signal reaches a select threshold. In response, the opto-isolator device 404 provides a voltage signal suitable for use by the lower voltage circuit (e.g. internal circuitry or CPU 206 of the power system device 104 of FIG. 2). The voltage of the signal provided by the opto-isolator device 404 is generally lower than the voltage of the signal received by the voltage threshold detection device 402. The voltage threshold detection device 402 and opto-isolator 404 may be constructed of a RoHS/PB-free material.

One or each of a voltage reducing circuit, a transient voltage suppressor, a DC conversion circuit and a protection circuit may preprocess the higher voltage signal such that it is suitable for use by the voltage threshold detection device 402 and the opto-isolator device 404. For example, the present disclosure contact-input circuit 400 may include a voltage reducing circuit adapted to reduce the higher voltage signal to a voltage acceptable to the voltage threshold detection device 402. The voltage reducing circuit may include a plurality of resistors 406a, 406b, 406c and 406d. With this arrangement, the contact-input circuit 400 may accommodate about a 24V~250V voltage signal. A transient voltage suppressor 408 may also be coupled to the voltage reducing circuit to limit higher transient voltages in the reduced higher voltage signal.

The present disclosure contact-input circuit 400 may further be adapted to process both AC voltage signals and DC voltage signals. For example, in FIG. 4, a circuit adapted to convert an AC voltage signal to a DC voltage signal is provided in the form of a plurality of rectifiers 410a, 410b, 410c and 410d. A protection circuit in the form of a zener diode 412 may be provided to ensure that the maximum voltage across the voltage threshold detection device 402 and the opto-isolator device 404 are within safe limits.

Now referring back to the voltage threshold detection device 402 in detail. The voltage threshold detection device 402 generally receives a higher voltage signal from power system equipment or another power system device or receives a preprocessed higher voltage signal. Because the contact-input circuit is used in a power system application, the voltage threshold detection device 402 is generally adapted to receive a higher voltage signal of 6.5V or higher. The voltage threshold detection device 402 is also generally adapted to provide a valid output even when it receives a higher voltage signal of about 1V. As shown in slopes 520 and 530 of FIG. 5, the voltage threshold detection device 402 converts the linear function of the $V_{in}$-$I_{in}$ into a threshold-step function and a ramp-up current is not necessary. That is, the threshold detection device conducts current throughout the slopes 520 and 530, but does not allow current to flow through the opto-isolator until it detects that the $V_{in}$ reaches a predetermined threshold 550, at which time the threshold detection device allows current to flow through the opto-isolator, thus asserting the contact-input. Accordingly, the value of $R_{in}$ may be higher than that of the traditional contact-input arrangement of FIG. 3, thereby reducing power-dissipation and heat. The present disclosure arrangement has been shown to reduce power consumption and heat by about 40% to about 60% as compared to traditional contact-input arrangements (about 4.5 mA~6.0 mA as compared to about 9.5 mA~10 mA in traditional arrangements). Also, in one embodiment, the voltage threshold detection device 402 is selected such that its quiescent current is less than about 500 µA. Accordingly, the voltage threshold detection device 402 allows current to flow therefrom when it detects that the received voltage signal reaches a select threshold without drawing any excessive current. In one embodiment, the threshold is selected at a voltage level of about 4.6V. In one embodiment, the voltage threshold detection device 402 is generally adapted to allow less than 5 mA of current to flow therefrom. In another embodiment, the voltage threshold detection device 402 may include a hysteresis apparatus to minimize output chatter.

In traditional power system device applications, threshold devices are generally coupled to the device's microprocessor and used to monitor the device's internal power supply. If a monitored voltage reaches a select threshold, the device is adapted to generate a corrective action signal to the microprocessor (e.g., for "Power-Fail" or a "System-Reset" signal). These threshold devices used in traditional applications generally have detection and output assertion timing delays, which typically range from a few hundred microseconds to a few hundred milliseconds. These relatively slow timing delays are generally acceptable for traditional power supply monitoring functions. For contact-input circuits, it is preferable that these delays be minimized. Accordingly, the voltage threshold detection device 402 generally has a detection and output-assertion (e.g., allowing current flow) delay of less than about 500 ns.

Because power system devices are generally subjected to harsh environments, it is desirable to select a voltage threshold device that can provide precise comparator thresholds and maintain a select voltage reference even at the most extreme conditions. In one embodiment, the voltage threshold device 402 is selected such that it includes a reference-generator which is adapted to maintain a 1.2V reference at temperatures ranging from about −40 to about 85° C. In another embodiment, the voltage threshold device 402 is selected such that it provides a precise comparator threshold from about 4.5V to about 4.7V at the voltage threshold detection device 402 is generally adapted to receive a higher voltage signal of about 6.5V or higher. Examples of voltage threshold devices that may be used in conjunction with the present disclosure include the MC33064 UnderVoltage Sensing Circuit available from ON Semiconductor (Phoenix, Ariz.), the MAX9000, Low-Power, High-Speed, Single-Supply Op-Amp+Comparator+Reference IC, available from Maxim Integrated Products, Inc. (Sunnyvale, Calif.), and the AD8214-High Voltage Threshold Detector available from Analog Devices, Inc. (Norwood, Mass.).

Now referring back to the opto-isolator device 404 in detail. The opto-isolator device 404, which is coupled to the voltage threshold detection device 402, provides a voltage signal suitable for use by the lower voltage circuit (e.g. internal circuitry or CPU 206 of the power system device 104 of FIG. 2) upon receipt of current flow from the voltage threshold detection device 402. The opto-isolator 404 is used to provide a protected and isolated connection between the relatively delicate lower voltage circuit and the highly noisy, hazardous higher voltage signal from external devices. The opto-isolator 404 generally includes an optical connection having a photo-diode and photo-transistor between its input and output, thus avoiding electrical coupling. In this way, the opto-isolator device 404 is adapted to isolate the lower voltage circuit from the higher voltage signal by providing a safe signal transfer with very high isolation. For example, the opto-isolator device 404 may be adapted to provide about 5 kV (RMS) isolation between the higher input signal side and the lower voltage circuit. The opto-isolator device 404 may further be selected to have a common-mode transient immunity of about 2000V/u with a voltage common mode (Vcm) higher than about 300V. Moreover, the opto-isolator device 404 may further be selected to have a logic supply voltage of about 5V and be adapted such that it is compatible with 5V logic signals.

Traditional opto-isolators have very slow operational speeds. More specifically, traditional opto-isolator devices have current-transfer ratios (from input to output) of typically between about 50% to about 80% over the entire temperature range. For these traditional opto-isolator devices, it takes several milliamperes of current (about 10 mA to about 50 mA) to power the opto-isolator device. Accordingly, the opto-isolator device 404 is selected such that it may be powered with less than about 5 mA, but at the same time may have a current capacity of greater than about 10 mA. For traditional opto-isolators, it takes several microseconds to transfer the signal from input to output. Accordingly, the opto-isolator device 404 is selected to have an input to output propagation delay of less than about 350 ns. Moreover, in another embodiment, the opto-isolator device may include a totem-pole type output having a Schmitt trigger for faster signal propagation.

Because power system devices are generally subjected to harsh environments, it is desirable to select an opto-isolator device that can maintain protection and isolation even at the most extreme conditions. In one embodiment, the opto-isolator device 404 is selected to have an input to output propagation delay of less than about 350 ns over a temperature range of from about −40 to about 85° C. In another embodiment, the opto-isolator device is selected to provide an isolation resistance of greater than about 1 Gohm over a temperature range of about −40 to about 85° C. Examples of opto-isolators that may be used in conjunction with the present disclosure are the SFH6711 High Speed Optocoupler available from Vishay Intertechnology, Inc. (Heilbronn, Germany) and the HCPL-2211/12/19, Very-High CMR, Wide VCC, Logic-Gate Optocoupler, available from Agilent Technologies, Inc. (Santa Clara, Calif.).

Figure 5:
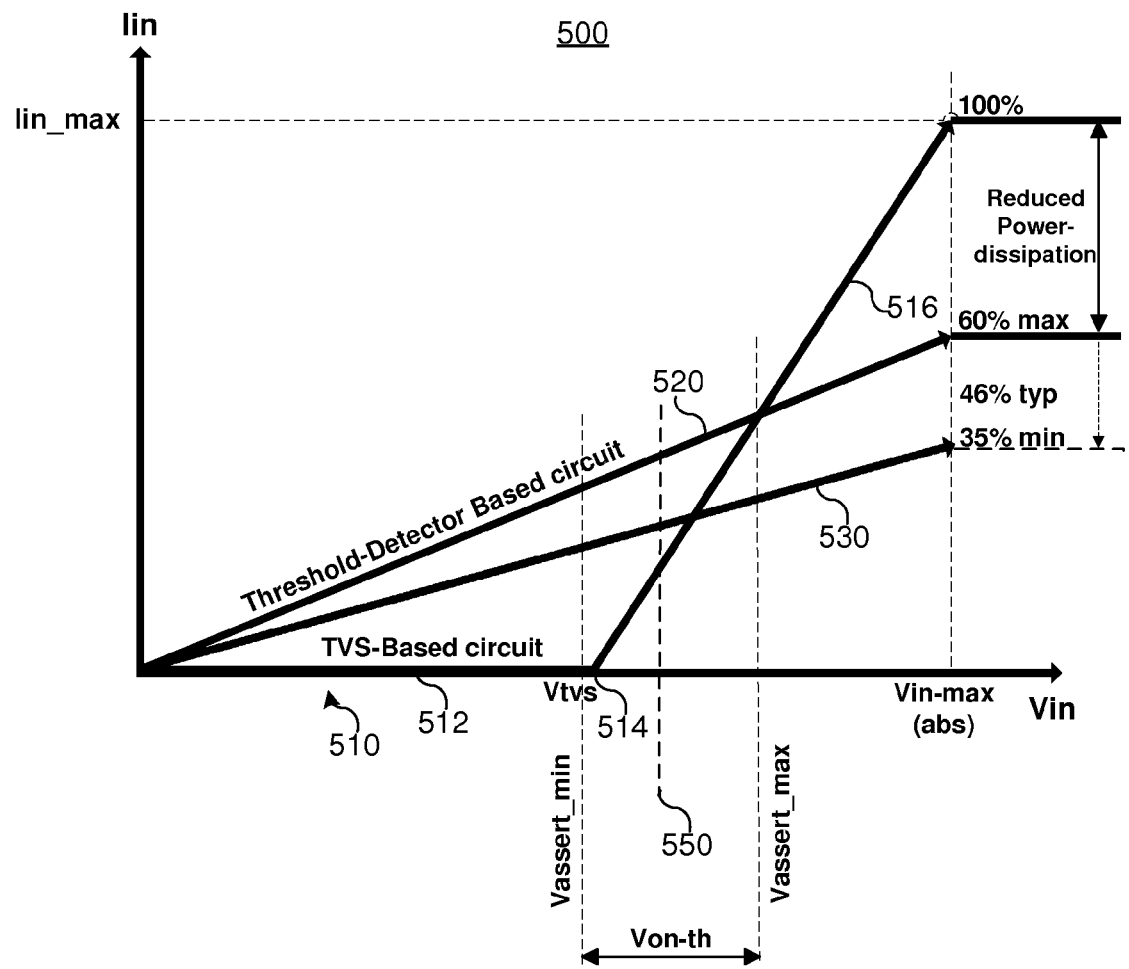
FIG. 5 is graph showing the performance comparison between the prior art contact-input circuit of FIG. 3 and the contact-input circuit arrangement according to FIG. 4.

The present disclosure contact-input circuit arrangement 400 provides a voltage signal suitable for use by the lower voltage circuit within less than one micro-second. Also, as can be seen in FIG. 5, the voltage and current levels in the present disclosure contact-input circuit arrangement 400 are much lower than that of traditional contact-input arrangements, thereby providing higher precision and finer control of the system. FIG. 5 illustrates a plot 500 of the response of a traditional TVS-Based circuit 510 (such as that illustrated and described in conjunction with FIG. 3), as well as responses from circuits designed according to the present disclosure. It should be noted that the ramp time from the origin of plot 500 to $V_{in\_max}$ is in the range of milliseconds whereas the steady-state time (when the contact-input circuit is asserted) may be quite long, such as from several seconds to weeks. Indeed, the steady-state time may persist until it is deasserted. The traditional TVS-based circuit gives no $I_{in}$ response 512 until the $V_{assert\_min}$ 514 has been reached. At that point, the TVS begins conducting, current flows through the opto-isolator, and the slope 516 becomes quite steep and slope continues until it reaches the maximum input voltage $V_{in\_max}$. It should be noted that at the maximum input voltage $V_{in\_max}$ the dissipation is indicated at 100% in FIG. 5. This condition is maintained until the contact input is deasserted. The amount of energy given off by maintaining the traditional TVS-based circuit at these conditions for an extended period of time (possibly minutes, hours, days, or even weeks) is relatively high as compared with the contact-input circuit of the present disclosure. Referring to FIG. 3 and FIG. 5, the slope 516 depicts the TVS 302 suppressing the voltage input signal until it reaches the break-down voltage of the TVS 302, which is typically about 60% of the nominal voltage of the contact-input circuit 300. Once the voltage input signal reaches the break-down voltage of the TVS 302, current flows through the TVS 302, the resistor 304 and the opto-isolator 306.

The threshold-detector based circuits of the present disclosure, however, exhibit linear slopes 520, 530 in response to detecting $V_{in}$. No current is directed through the opto-isolator until the threshold detection device 402 detects that the input voltage $V_{in}$ has reached a predetermined threshold 550. At that point, current is allowed to flow through the opto-isolator. At the point that $V_{in\_max}$ is reached, the power dissipation of the threshold-detector based circuits is 35%-60% of the power dissipation of the TVS-based circuit. As indicated above, the contact-input may remain asserted for a relatively long period of time, during which the circuit of FIG. 4 dissipates significantly less energy than the traditional TVS-based circuit. Accordingly, referring to FIG. 4 and FIG. 5, the slopes 520, 530 depict the voltage threshold detection device 402 adapted to receive the higher voltage signal and allow current to flow through the opto-isolator 404 when the voltage threshold detection device detects that the high voltage signal reaches a select threshold.

While this disclosure includes reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A contact-input circuit for high-speed communication among power system devices, for detecting and processing a higher voltage communication signal from a second power system device for use by a lower voltage circuit of a first power system device, the contact-input circuit of the first power system device comprising:
    a voltage threshold detection device adapted to detect presence of the higher voltage communication signal from the second power system device and to receive the higher voltage communication signal from a contact input; and,
    an opto-isolator device coupled to the voltage threshold detection device, wherein the voltage threshold detection device conducts current to the contact input, and only when the voltage threshold detection device detects that the higher voltage communication signal from the second power system device reaches a select threshold indicating presence of the higher voltage communication signal, the voltage threshold detection device allows current to flow through the opto-isolator thereby allowing said opto-isolator to provide a voltage signal suitable for use by the lower voltage circuit.

2. The contact-input circuit of claim 1, wherein the opto-isolator isolates the lower voltage circuit.

3. The contact-input circuit of claim 2, wherein the opto-isolator provides 5 KV (RMS) isolation.

4. The contact-input circuit of claim 1, further comprising a voltage reducing circuit adapted to reduce the higher voltage communication signal to a voltage acceptable to the threshold detection device.

5. The contact-input circuit of claim 4, wherein the voltage reducing circuit comprises a plurality of resistors.

6. The contact-input circuit of claim 1, further comprising a transient voltage suppressor adapted to limit higher transient voltages in the higher voltage communication signal.

7. The contact-input circuit of claim 1, wherein the higher voltage communication signal is a DC voltage signal.

8. The contact-input circuit of claim 1, wherein the higher voltage communication signal is an AC voltage signal.

9. The contact-input circuit of claim 8, further comprising a circuit adapted to convert the AC voltage signal to a DC voltage signal.

10. The contact-input circuit of claim 9, wherein the circuit adapted to convert the AC voltage signal to the DC voltage signal includes a plurality of rectifiers.

11. The contact-input circuit of claim 1, further comprising a protection circuit to ensure that a maximum voltage across the voltage threshold detection device is within a safe limit.

12. The contact-input circuit of claim 11, wherein the protection circuit to ensure that the maximum voltage across the voltage threshold detection device is within a safe limit includes a zener diode.

13. The contact-input circuit of claim 1, further comprising a protection circuit to ensure that a maximum voltage across the opto-isolator device is within a safe limit.

14. The contact-input circuit of claim 13, wherein the protection circuit to ensure that the maximum voltage across the opto-isolator device is within a safe limit includes a zener diode.

15. The contact-input circuit of claim 1, wherein the select threshold of the voltage threshold detection device is about 4.6V.

16. The contact-input circuit of claim 1, wherein the contact-input circuit provides the voltage signal in less than 1 microsecond after the voltage threshold device receives the higher voltage communication signal.

17. The contact-input circuit of claim 1, wherein the voltage threshold device and opto-isolator consume less than 4.5 mA.

18. The contact-input circuit of claim 1, wherein the voltage threshold detection device further comprises a reference generator.

19. An input circuit of a first power system device, for high-speed communication among power system devices, for detecting a communication signal from a second power system device and producing an input signal suitable for use by an internal circuit of the first power system device, comprising:
    an opto-isolator device configured to provide the input signal to the internal circuit; and,
    a voltage threshold detection device to detect the communication signal from the second power system device, in communication with the opto isolator device and a contact input, allowing current to flow to the contact input, and only allowing current to flow through the opto-isolator for producing the input signal in response to detecting the communication signal from the contact input applied thereto above a predetermined threshold.

20. The input circuit of claim 19, wherein the input signal comprises a lower voltage than the communication signal applied to the voltage threshold detection device.

21. The input circuit of claim 19, wherein the communication signal applied to the voltage threshold detection device is provided thereto by the second power system device.

22. The input circuit of claim 19, further comprising a voltage reducing circuit adapted to reduce the communication signal applied to the voltage threshold detection device to a voltage acceptable to the threshold detection device.

23. The input circuit of claim 19, further comprising a transient voltage suppressor adapted to limit higher transient voltages in the communication signal applied to the voltage threshold detection device.

24. The input circuit of claim 19, further comprising a protection circuit to ensure that a maximum voltage across the voltage threshold detection device is within a safe limit.

25. The input circuit of claim 19, further comprising a protection circuit to ensure that a maximum voltage across the opto-isolator is within a safe limit.

26. The input circuit of claim 19, wherein the voltage threshold detection device comprises a reference generator.

27. A contact-input circuit of a first power system device for high-speed communication between the first power system device and a second power system device, the contact-input circuit comprising:
- a voltage threshold detection device adapted to receive a higher voltage communication signal from the second power system device and to detect presence of the higher voltage communication signal; and,
- an opto-isolator device in electrical communication with the voltage threshold detection device, wherein the voltage threshold detection device conducts current to the contact input, and, only when the voltage threshold detection device detects that the higher voltage communication signal from the second power system device reaches a select threshold indicating presence of the higher voltage communication signal, the voltage threshold detection device allows current to flow through the opto-isolator thereby allowing said opto-isolator to provide a voltage signal suitable for use by a lower voltage circuit,
- wherein the contact-input circuit provides a voltage signal in less than 1 microsecond after the voltage threshold device receives the higher voltage communication signal.

* * * * *